United States Patent [19]

Sliger

[11] 4,245,781

[45] Jan. 20, 1981

[54] ENGINE COOLING SYSTEM THERMOSTAT AND METHOD OF MAKING THE SAME

[75] Inventor: Boyd P. Sliger, Concord, Tenn.

[73] Assignee: Robertshaw Controls Company, Richmond, Va.

[21] Appl. No.: 24,576

[22] Filed: Mar. 28, 1979

Related U.S. Application Data

[60] Continuation-in-part of Ser. No. 886,536, Mar. 14, 1978, Pat. No. 4,171,767, which is a division of Ser. No. 688,751, May 21, 1976, Pat. No. 4,091,991.

[51] Int. Cl.³ .............................................. F01P 7/02
[52] U.S. Cl. ............................ 236/34.5; 137/454.2; 285/178; 403/350
[58] Field of Search ......................... 285/178, 175; 137/454.2; 236/34.5, 34; 403/350, DIG. 8

[56] References Cited

U.S. PATENT DOCUMENTS

| 2,157,770 | 5/1939 | Mayo | 236/34 |
|---|---|---|---|
| 2,284,847 | 6/1942 | Raymond | 403/350 |
| 2,397,382 | 3/1946 | Smith | 403/350 |
| 2,810,524 | 10/1957 | Puster | 236/34 |
| 2,949,692 | 8/1960 | Kuhn | 285/178 X |
| 3,173,442 | 3/1965 | McKillip | 137/454.2 X |
| 3,514,570 | 5/1970 | Bernard et al. | 285/178 X |
| 3,667,788 | 6/1972 | Greenwood | 285/178 X |
| 3,907,199 | 9/1975 | Kreger | 236/34.5 X |

Primary Examiner—William E. Tapolcai, Jr.
Attorney, Agent, or Firm—Candor, Candor & Tassone

[57] ABSTRACT

A vehicle-type thermostat having a housing provided with a valve seat that is controlled by a movable valve member which is interconnected to a temperature responsive device which is carried by the housing, the housing having interference fit positioning abutments thereon for rotationally orienting the housing in a vehicle engine cooling system whereby the structure of the thermostat can be disposed in a desired rotational position within the engine cooling system.

26 Claims, 9 Drawing Figures

ENGINE COOLING SYSTEM THERMOSTAT AND METHOD OF MAKING THE SAME

CROSS REFERENCE TO RELATED APPLICATIONS

This application is a continuation-in-part application of its copending parent patent application Ser. No. 886,536, filed Mar. 14, 1978, now U.S. Pat. No. 4,171,767, which, in turn, is a divisional patent application of its copending parent patent application, Ser. No. 688,751, filed May 21, 1976, now U.S. Pat. No. 4,091,991.

BACKGROUND OF THE INVENTION

1. Field of the Invention

This invention relates to an improved vehicle-type thermostat, an outlet housing for receiving such a thermostat and to an engine cooling system utilizing such a thermostat and outlet housing as well as to a method of making such a thermostat, outlet housing or engine cooling system.

2. Prior Art Statement

It is well known that automobile-type thermostats have been provided wherein each has a notch or hole to provide a leak path for the air being displaced by fluid or water as the cooling system of the engine utilizing such thermostat is being filled.

It is also well known that automobile-type thermostats have been provided wherein each has a bypass through the thermostat and leading to a conduit means for the vehicle heater so that the thermostat will not control such flow of coolant to the heater.

SUMMARY OF THE INVENTION

It is a feature of this invention to provide an improved vehicle-type thermostat that has means for automatically rotationally positioning the same in an outlet housing of a vehicle engine cooling system.

For example, it is known that automobile-type thermostats have each been provided with a leak notch or hole to provide a leak path for the air being displaced by fluid or water as the cooling system of the engine utilizing such thermostat is being filled. However, if such a leakage arrangement is not being utilized, the cooling system cannot be filled completely and even with a leak arrangement, air will escape only until the level of the coolant being added reaches the level of the leak notch (or slightly above the same depending on the height of the filler neck above the leak arrangement), at which point the trapped air volume will prevent additional filling.

On some automobile engines, the thermostat is mounted with the center line of the thermostat substantially parallel to the engine crankshaft and thereby is perpendicular to the radiator. In this particular engine arrangement, the amount of coolant which can be added during filling is dependent upon the level of which the leak notch in the thermostat happens to be installed. If installed in its uppermost level, a maximum amount of coolant can be added to a level slightly above the leak notch level. If, however, the leak notch happens to be installed at a lower level, a lesser amount of coolant can be added.

It has also found that on some automobile engines, it is desired that a passageway to a bypass circuit or the like be supplied coolant from the water outlet housing independently of the operation of the vehicle-type thermostat disposed therein. For example, in this arrangement, coolant can be circulated to the passenger cabin heater independently of the operation of the vehicle-type thermostat.

Thus, it can be seen that by utilizing the positioning feature of this invention, the automobile-type thermostat of this invention can be automatically oriented in the opening of the outlet housing of the engine cooling system to provide for any one of the above functions.

In particular, one embodiment of this invention provides a vehicle-type thermostat having a housing means provided with a valve seat which is controlled by a movable valve member which is interconnected to a temperature responsive device that is carried by the housing means, the housing means having positioning means thereon for rotationally orienting the housing means in a vehicle engine cooling system whereby the thermostat will be disposed in the desired rotational position in the cooling system.

For example, the thermostat of this invention can be inserted into an outlet housing of an engine cooling system and be rotated in either direction about a horizontal axis thereof until the positioning means of the thermostat abut against the positioning means of the outlet housing means whereby a leak arrangement of the thermostat will be disposed substantially near the top or uppermost position thereof for the above described purpose.

In another embodiment of this invention, the thermostat of this invention can be inserted into an outlet housing of the engine cooling system and be rotated in either direction about the horizontal axis thereof until the positioning means of the thermostat abuts against the positioning means of the outlet housing whereby an opening in the thermostat will be oriented adjacent an exit means of the outlet housing so that coolant can continuously flow to the exit means from the oriented opening of the thermostat regardless of the operation of the thermostat for its conventional purpose.

Accordingly, it is an object of this invention to provide an improved vehicle-type thermostat having one or more of the novel features of this invention as set forth above or hereinafter shown or described.

Another object of this invention is to provide an improved outlet housing for a vehicle engine cooling system and having one or more of the novel features of this invention as set above or hereinafter shown or described.

Another object of this invention is to provide an improved vehicle engine cooling system utilizing such a thermostat and outlet housing.

Another object of this invention is to provide a method of making such a thermostat, the method of this invention having one or more of the novel features of this invention as set forth above or hereinafter shown or described.

Another object of this invention is to provide a method of making such an outlet housing, the method of this invention having one or more of the novel features of this invention as set forth above or hereinafter shown or described.

Another object of this invention is to provide a method of making such an improved vehicle engine cooling system, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter described and illustrated as being particularly adapted to position a vehicle-type thermostat in an engine cooling system so as to insure that a leak arrangement of the thermostat is in the uppermost position thereof or that an opening means thereof is aligned with an exit means, it is to be understood that the various features of this invention can be used singly or in any combination thereof to provide a vehicle-type thermostat to be positioned for other purposes as desired.

Therefore, this invention is not to be limited to only the embodiments illustrated in the drawings, because the drawings are merely utilized to illustrate some of the wide variety of uses of this invention.

Figures 1, 3:
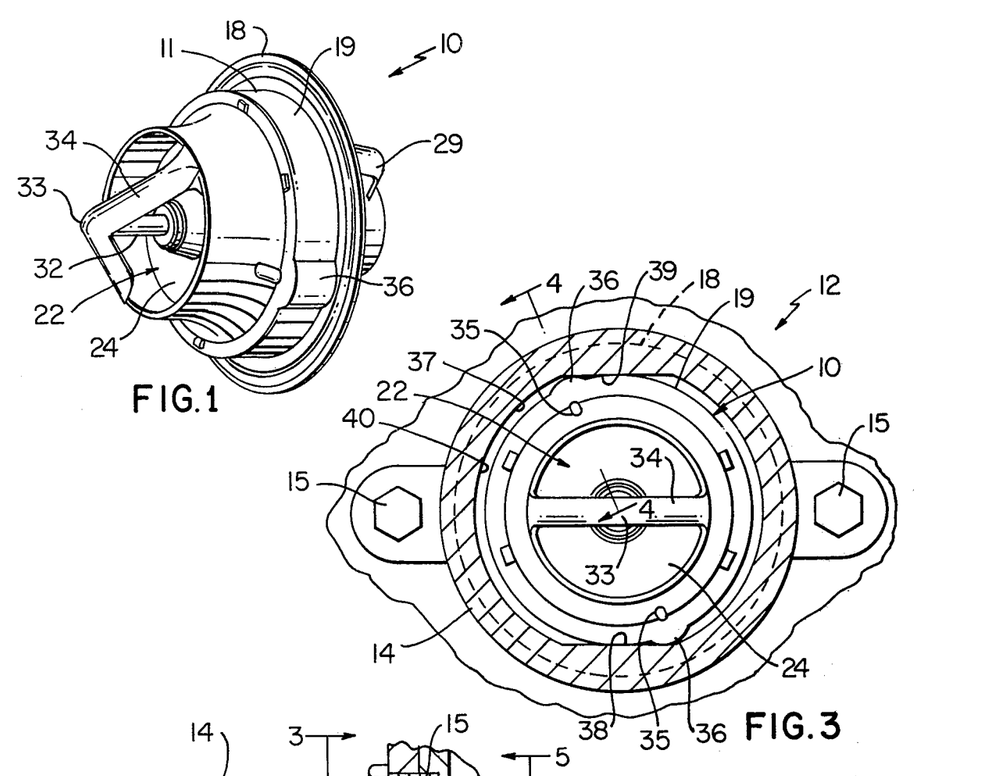
FIG. 1 is a perspective view of one embodiment of the improved vehicle-type thermostat of this invention.
FIG. 3 is a fragmentary, cross-sectional view taken on line 3—3 of FIG. 2.
Figure 2:
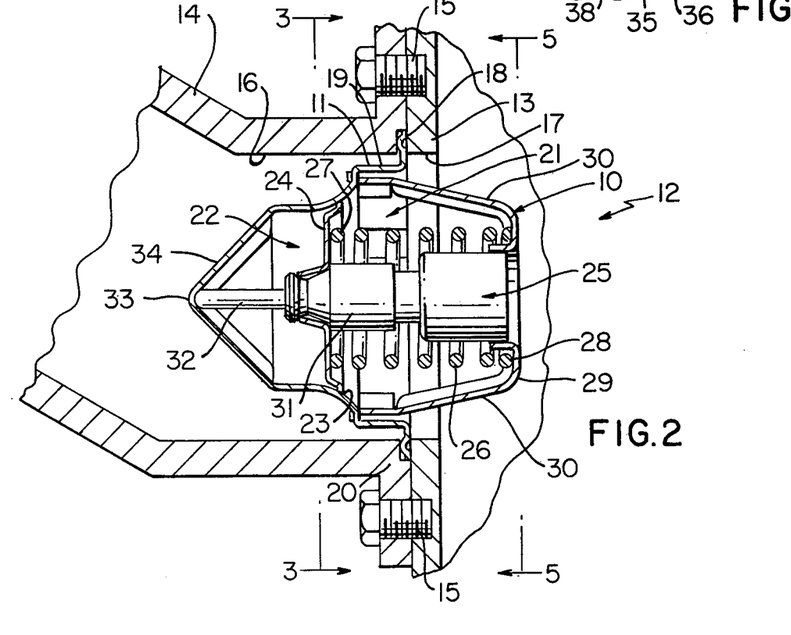
FIG. 2 is a cross-sectional view illustrating the thermostat of FIG. 1 installed in an engine cooling system.

Referring now to FIGS. 1 and 2, one embodiment of the improved vehicle-type thermostat of this invention is generally indicated by the reference numeral 10 and comprises a housing means 11 adapted to be inserted in an engine cooling system that is generally indicated by the reference numeral 12 in FIG. 2 and comprises a conduit means 13 having an outlet housing 14 secured thereto by fastening bolts 15 so that the passage 16 of the outlet housing 14 is in aligned relation with the opening 17 in the conduit 13.

The housing 11 of the thermostat 10 has an outwardly directed annular flange 18 extending from one end of a cylindrical housing section 19, the annular flange 18 being adapted to be sandwiched between a stepped annular flange 20 of the outlet housing 14 and the conduit 13 so as to completely block the interconnection between the conduit 13 and the outlet housing 14.

However, the housing 11 of the thermostat 10 is provided with an inlet 21 that is adapted to be disposed in fluid communication with the conduit 13 and an outlet 22 that is adapted to be disposed in fluid communication with the passage 16 of the outlet housing 14, the housing means 11 having an annular valve seat surface 23 in the housing means 11 between the inlet 21 and outlet 22 thereof that is adapted to be opened and closed by a movable valve member 24 carried by a piston and cylinder temperature responsive device that is generally indicated by the reference numeral 25 and is conventional in the art, the valve member 24 being urged to its closed position by a compression spring 26 having one end 27 bearing against the valve member 24 and the other end 28 thereof bearing against a spring retainer 29 interconnected to the housing means 11 by a pair of integral strap members 30.

The piston and cylinder temperature responsive device 25 has its cylinder means 31 carrying the valve member 24 while the piston 32 thereof bears against the apex 33 of a V-shaped strap 34 that is formed integral with the housing means 11 as illustrated whereby upon the heating of a wax charge in the cylinder means 31 to cause the wax charge to expand when the same reaches a certain temperature, the piston and cylinder arrangement 25 causes the cylinder means 31 and, thus, the valve member 24 to move to the right in FIG. 2 in opposition to the force of the compression spring 26 to open the valve seat surface 23 in a manner well known in the art and permit some of the fluid passing through the conduit 13 to be by-passed into the outlet housing 14 and be cooled in the engine radiator before the same is passed back to the cooling system conduit 13 in a manner well known in the art. Of course, when the temperature being sensed by the device 25 is below the predetermined condition, the wax charge contracts and the compression spring 26 will move the valve member 24 to close the valve seat surface 23 and thereby prevent communication between the conduit 13 and the outlet housing 14.

Figure 4:
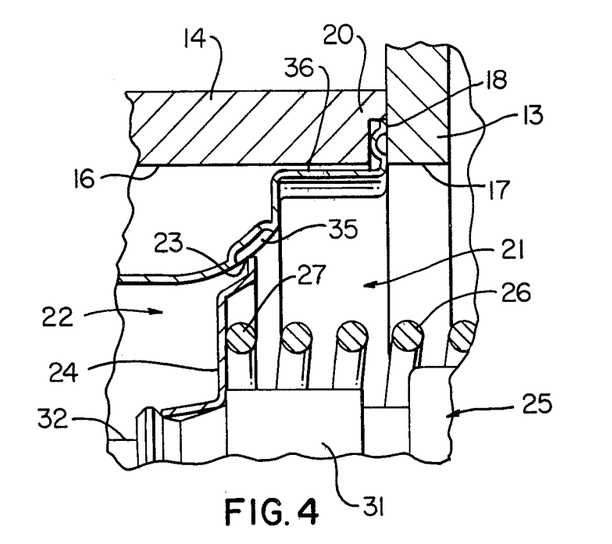
FIG. 4 is an enlarged, fragmentary, cross-sectional view taken on line 4—4 of FIG. 3.

The housing 11 of the thermostat 10 of this invention is provided with two diametrically disposed leak notches 35 formed in the valve seat surface 23 so as to bridge the valve member 24 when the valve member is disposed in the closed position as illustrated in FIG. 4 whereby each notch 35 provides a leakage path between the inlet 21 and the outlet 22 of the thermostat 11 for air to escape across the closed valve member 24 when coolant or water is being added to the engine cooling system 12 for the reasons previously stated.

Also as previously stated, it has been found according to the teachings of this invention, that it is desirable to always have one of the leak arrangements 35 of the thermostat 10 of this invention located in substantially the uppermost position thereof so that the maximum amount of coolant or water can be added to the system 12 as previously stated because the thermostat 10 is mounted in the horizontal manner illustrated in FIG. 2.

In order to insure that the thermostat 10 will always be mounted in the cooling system 12 with one of the leak notches 35 in substantially the uppermost position thereof, the substantially cylindrical housing section 19 of the thermostat 10 is provided with a pair of integral outwardly directed diametrically opposed abutments or positioning means 36 which are substantially semi-circular or arcuate in cross-section, such abutments 36 being located on substantially the same diameter on which the diametrically opposed leak notches 35 are located in the manner illustrated in FIG. 3.

The outlet housing 14 has the passage 16 provided with a substantially elliptical cross section or opening 37 adjacent the flange 20 thereof as illustrated in FIG. 3 wherein the horizontal diameter of the elliptical opening 37 is the largest diameter of the opening 37 while the vertical diameter of the opening 37 is the smallest diameter of the elliptical opening 37. In this manner, two pairs of diametrically opposed abutment surfaces 38 and 39 are formed on the internal peripheral force of the elliptical opening 37 which will cooperate with the abutment means 36 of the housing 11 of the thermostat 10 in a manner now to be described, the length of the diameter for each pair of abutment surfaces 38 and 39 being intermediate the largest and smallest diameters of the opening 37.

When the thermostat 10 is initially to be disposed in the engine cooling system 12, the outlet housing 14 is unfastened from the conduit 13 through the removal of the bolts 15. The thermostat 10 is then inserted into the elliptical opening 37 of the outlet housing 14 with the abutment means 36 being located generally on the larger diameter of the opening 37 and then the thermostat 10 is rotated in either a clockwise or counterclockwise direction until the abutments 36 thereof abut into interference with the positioning surfaces 38 or 39 of the outlet housing 14 as the case may be, FIG. 3 illustrating the abutments 36 having been rotated in a clockwise direction to interfere with the positioning surfaces 38 whereby one of the leak notches 35 is disposed in substantially the uppermost position thereof as illustrated. Thereafter, the outlet housing 14 is then resecured to the conduit 13 by the fastening bolts 15 whereby the thermostat 10 will be clamped and held in the rotational position of FIG. 3 for the reasons previously set forth.

Therefore, it can be seen that in order for the thermostat 10 to be inserted into the elliptical opening 37 of the outlet housing 14, the abutments 36 of the housing 11 must be inserted somewhere inbetween the largest diameter of the elliptical opening 37 and the diameter of the positioning surfaces 38 and 39 and once the thermostat is so inserted, the thermostat 10 is merely rotated in a clockwise or counterclockwise direction to properly position the thermostat 10 so that one of leak arrangements 35 thereof will be in substantially the uppermost position thereof for the purpose previously set forth.

While the thermostat 10 has been previously described as utilizing the positioning abutments 36 thereof to position the leak arrangements 35 relative to the outlet housing 14, it is to be understood that other structural features of the thermostat 11 can be so positioned.

For example, in many engines the inlet water to the thermostat 10 is directed perpendicular to the center line of the thermostat 10 and in such arrangements, it is possible to insure that the spring straps 30 that retain the spring 26 will be oriented so that the flow does not directly impinge into the strap legs 30 and thereby provide a restriction in the flow.

Figure 5:
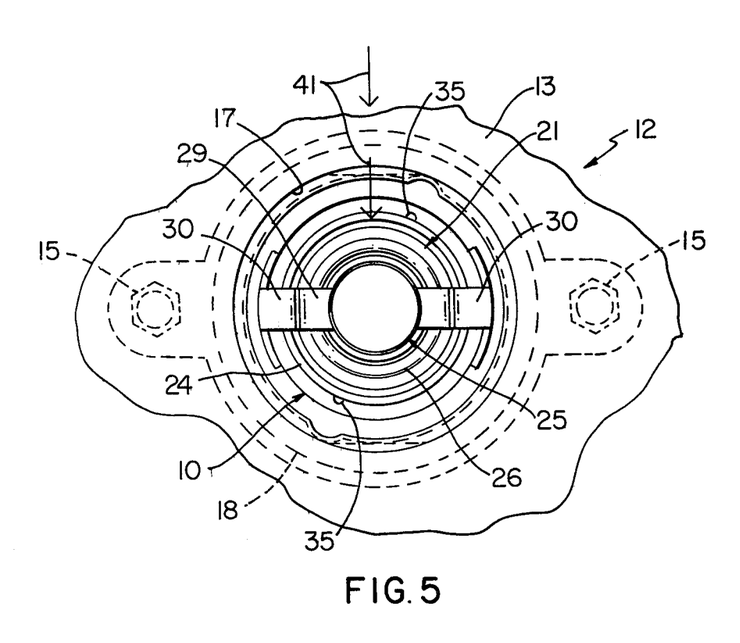
FIG. 5 is a fragmentary, cross-sectional view taken on line 5—5 of FIG. 2.

In particular, it can be seen that by placing the straps 30 in a predetermined position relative to the positioning means 36, the position of the straps 30 can be aligned in a position for maximum fluid flow to the thermostat 10 in the manner illustrated in FIG. 5 wherein the normal flow of the cooling fluid is represented by the arrows 41 and the straps 30 are disposed on a center line of the thermostat 10 that is generally perpendicular to such fluid flow 41 by the positioning means 36 cooperating with the positioning means 38 or 39 of the outlet housing 14 in the manner previously described.

In a like manner, the bridge or abutment means 34 on the downstream side of the thermostat could be aligned in a position to allow maximum flow in those applications in which the flow outlet configurations makes an abrupt change in direction.

Therefore, it can be seen that other structural features of the thermostat 10 could be properly oriented relative to the structural means of the engine cooling system 12 through the proper use of the positioning means 36, 38 and 39 in the manner previously described.

While the positioning means 36 of the thermostat 10 are illustrated as being on the cylindrical section 19 of the housing means 11, it is to be understood that the positioning means 36 could be located on the annular flange 18 thereof and the elliptical opening 37 of the outlet housing 14 could be merely provided in the stepped flange 20 with such elliptical opening 37 and positioning means 36 functioning in the same manner to rotationally position the thermostat in the outlet housing 14 for the reasons previously set forth.

Another embodiment of the improved vehicle-type thermostat of this invention is generally indicated by the reference numeral 10A in FIGS. 6–9 and parts thereof similar to the thermostat 10 and engine cooling system 12 previously described are indicated by like reference numerals followed by the reference letter "A".

Figure 6:
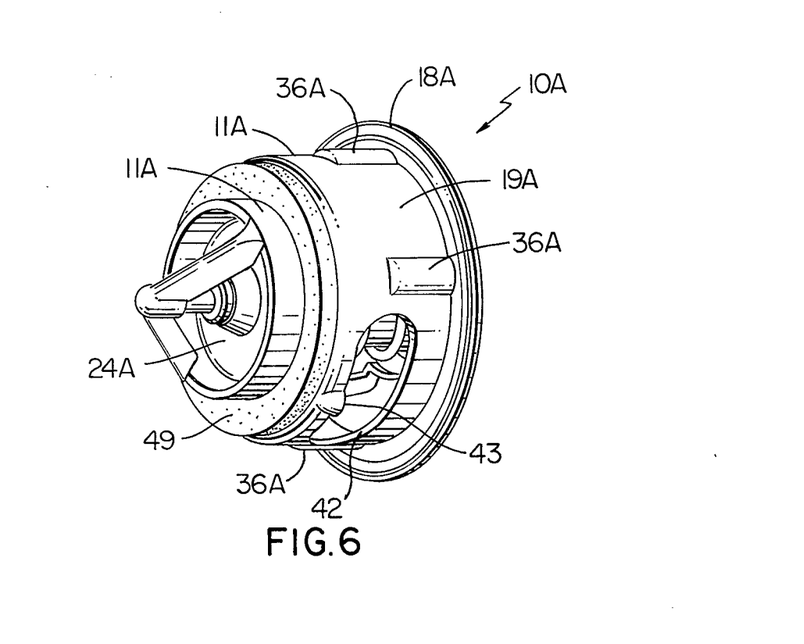
FIG. 6 is a perspective view of another embodiment of the improved vehicle-type thermostat of this invention.
Figure 7:
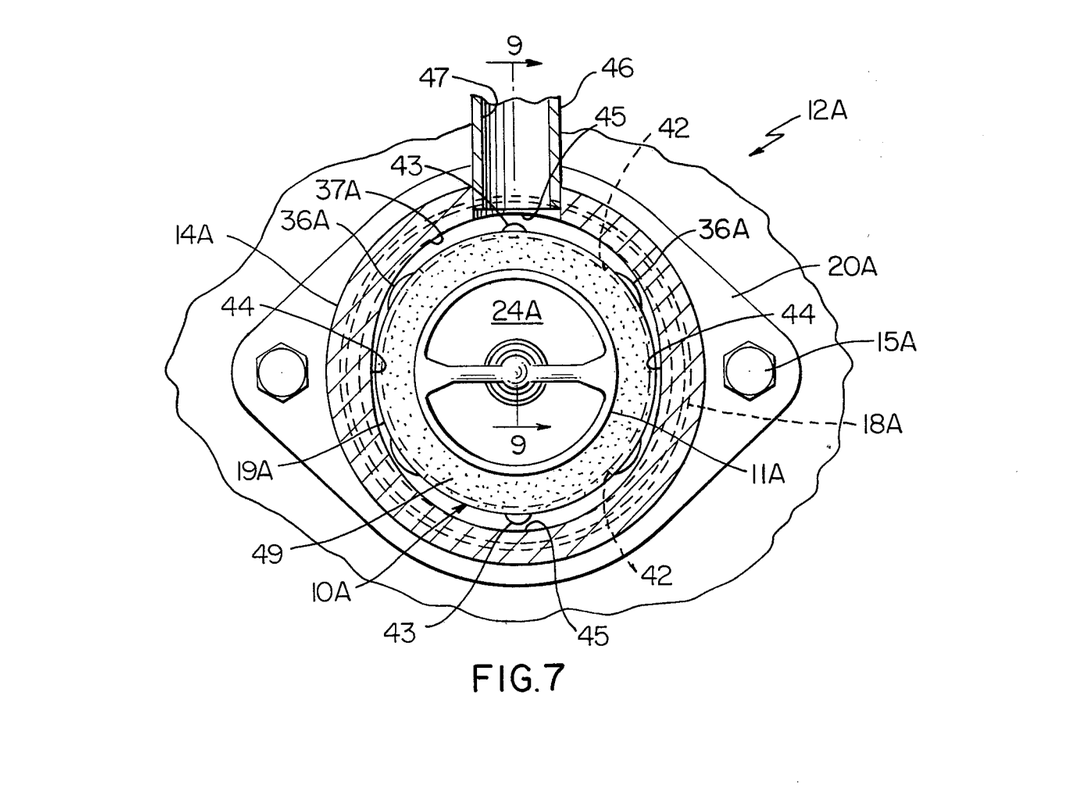
FIG. 7 is a cross-sectional view illustrating one step in the method of inserting the thermostat of FIG. 6 in the improved outlet housing of this invention illustrated as being utilized in an engine cooling system.

As illustrated in FIGS. 6 and 7, the housing section 19A of the housing means 11A of the thermostat 10A has four spaced integral abutments 36A formed circumferentially around the same for interference fit purposes similar to the interference fit of the abutment means 36 of the thermostat 10 previously described. However, the housing section 19A additionally has a pair of diametrically opposed openings 42 formed through the section 19A with each opening 42 having a tab means 43 carved adjacent thereto from the section 19A and bent outwardly as illustrated in the drawings for a purpose hereinafter described.

While the four abutments 36A are illustrated as being not exactly equally spaced circumferentially about the housing section 19A, although the same could be equally spaced, if desired, the abutments 36A define two pairs of opposed abutments 36A wherein each pair of opposed abutments 36A is so arranged that the abutments 36A in that pair are substantially diametrically opposed to each other, the abutments 36A being integrally formed in the housing section 19A by a conventional deforming die operation or the like.

The other structure of the thermostat 10A is substantially identical to the thermostat 10 previously described and therefor the details of such structure will not be repeated as the operation of the opening and closing movement of the valve member 24A thereof is the same as previously described for the thermostat 10.

Figure 8:
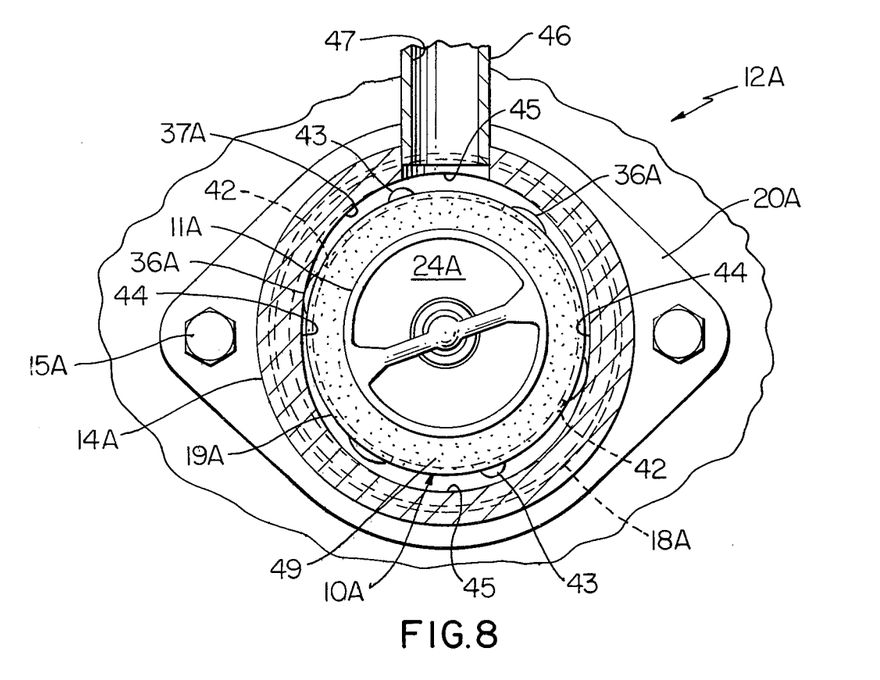
FIG. 8 is a view similar to FIG. 7 and illustrates the thermostat of FIG. 6 fully installed in the outlet housing of this invention.
Figure 9:
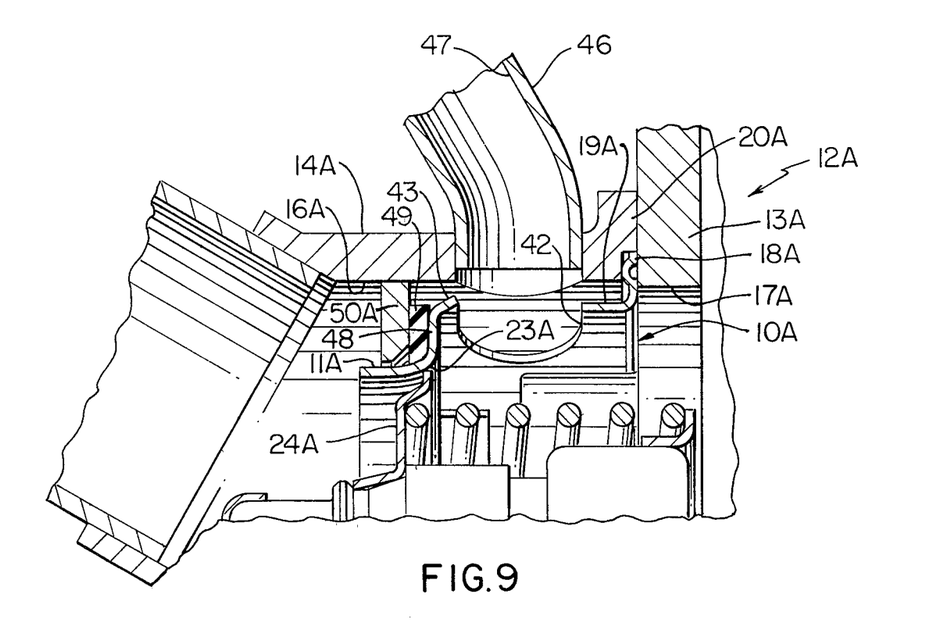
FIG. 9 is a fragmentary, cross-sectional view taken on line 9—9 of FIG. 7.

However, the outlet housing 14A of the engine cooling system 12A as illustrated in FIGS. 7–9 has the passage 16A thereof provided with a substantially oval cross-sectioned opening 37A adjacent the flange 20A thereof wherein the horizontal diameter of the opening 37A as illustrated in FIGS. 7 and 8 is the smallest diameter of the oval opening 37A as defined by the opposed surface means 44 of the outlet housing means 14A. Conversely, the vertical diameter of the opening 37A as illustrated in FIGS. 7 and 8 is defined by the largest diameter of the opening 37A and is defined between opposed surface means 45 of the outlet housing 14A.

The outlet housing 14A is also provided with an exit means or conduit section 46 which has its passage means 47 intersecting with the passage means 16A of the outlet housing 14A in the manner illustrated in FIGS. 7 and 9 for any desired purpose. However, in the embodiment of the engine cooling system 12A of this invention, the exit means 46 leads to the passenger cabin heater means (not shown) of the vehicle carrying the system 12A for a purpose hereinafter described.

The oval opening 37A of the outlet housing 14A has the opposed surface means 44 and 45 thereof so shaped that the diameter between a pair of diametrically opposed abutments 36A on the housing section 19A of the thermostat 10A is smaller than the major diameter between the opposed surfaces 45 and is larger than the minor diameter between the opposed surfaces 44.

The tabs 43 on the housing section 19A of the thermostat 10A define a diameter therebetween which is also smaller than the major diameter of the oval opening 37A between the surfaces 45 thereof but is larger than the minor or smaller diameter of the oval opening 37A between the surfaces 44 thereof.

In this manner, the tabs 43 insure that the thermostat 10A can only be initially inserted in the oval opening 37A substantially in the manner illustrated in FIG. 7 so that the opposed openings 42 in the housing section 19A will be arranged with one of the openings 42 being in alignment with the exit means 46 as illustrated in FIG. 7.

Therefore, the inserted thermostat 10A is rotated in either direction in the oval opening 37A until a pair of diametrically opposed abutments 36A thereof perform an interference fit with the opposed surfaces 44 of the oval opening 37A in the manner illustrated in FIG. 8 whereby the upper opening 42 in the housing section 19A of the thermostat 10A is disposed and maintained in alignment with the exit means 46 of the outlet housing 14A.

Thus, it can be seen in FIG. 9 that the installed thermostat 10A of this invention will have the upper opening 42 thereof disposed in alignment with the exit means 46 so that coolant from the engine means 13A will continuously pass through the upper opening 42 of the housing section 19A of the thermostat 10A into the passage means 47 of the exit means 46 to be conveyed to the heater of the vehicle containing the system 12A even though the valve member 24A of the thermostat 10A is disposed in its closed position against the valve seat means 23A as illustrated in FIG. 9.

Therefore, it can be seen that by providing the four spaced abutment means 36A on the housing section 19A of the housing means 11A of the thermostat 10A of this invention together with the oval opening 37A of the outlet housing 14A of this invention, an opening 42 in the housing section 19A will always be aligned with the exit means 46 because the tabs 43 insure that the thermostat 10A cannot be inserted in the oval opening 37A with the diametrically opposed openings 42 being aligned with the surfaces 44 rather than the surfaces 45 since the diameter between the diametrically opposed tabs 43 is larger than the diameter between the surfaces 44. Thus, in order for the thermostat 10A to be inserted in the opening 37A, the thermostat 10A must be inserted in the manner illustrated in FIG. 7 wherein the diametrically opposed openings 42 thereof are disposed vertically so that the upper most opening 42 will be aligned with the exit means 46 whereby subsequent rotation of the thermostat 10A in either a clockwise direction in FIG. 7 or a counterclockwise direction in FIG. 7 will cause a pair of diametrically opposed abutments 36A to interference fit with the opposed surface means 44 to hold that rotational position of the thermostat 10A relative to the outlet housing 14A.

Once the thermostat 10A has been rotated and interference fit with the particular pair of diametrically opposed abutment means 36A thereof disposed against the surface means 44 of the outlet housing 14A as illustrated in FIG. 8 with an annular shoulder 48 of the housing 11A compressing a sealing gasket 49 against an annular shoulder 50 in the opening 37A of the outlet housing 14A as illustrated in FIG. 9, the outlet housing 14A is secured by the fastening means 15A to the engine section 13A whereby the annular flange 18A of the thermostat 10A is trapped and held in the stepped flange means 20A of the outlet housing 14A. In this manner, the thermostat 10A is prevented from further rotation in the outlet housing 14A for the reasons previously set forth and is held in sealed relation against the annular shoulder 50 of the outlet housing 14A.

Therefore, it can be seen that in the operation of the thermostat 10A, regardless of when the valve member 24A thereof moves to open the valve seat 23A to interconnect the passage 17A of the engine means 13A with the passage means 16A of the outlet housing 14A, the upper opening 42 continuously bypasses coolant from the engine means 13A directly into the exit means 46 so that the heater means for the vehicle containing the system 12A can be continuously operated with such by-passed coolant independently of the opening and closing movement of the valve member 24A relative to valve seat 23A of the thermostat 10A.

As illustrated in FIG. 9, it can be seen that the coolant passing out of the openings 42 in the thermostat 10A is prevented from flowing to the passage 16A of the outlet housing 14A because the housing 11A of the thermostat 10A is sealed to the internal shoulder 50 of the outlet housing 14A by the sealing gasket 49.

Accordingly, it can be seen that this invention not only provides an improved vehicle-type thermostat, outlet housing means for containing such a thermostat and an engine cooling system utilizing such thermostat and outlet housing, but also this invention provides an improved method of making such a thermostat, outlet housing or engine cooling system utilizing such thermostat and outlet housing.

While the forms and methods of this invention, now preferred, have been illustrated and described as required by the Patent Statute, it is to be understood that other forms and method steps can be utilized and still fall within the scope of the appended claims.

What is claimed is:

1. In a vehicle type thermostat having a housing means provided with a valve seat that is controlled by a movable valve member which is interconnected to a temperature responsive device that is carried by said housing means, the improvement wherein said housing means has interference fit positioning means thereon for rotationally orienting said housing means in a vehicle engine cooling system whereby said thermostat can be disposed in the desired rotationaly position in said cooling system, said interference fit positioning means comprising a plurality of abutments on said housing means, said housing means including a substantially cylindrical section, said abutments being integral with said section, said cylindrical section having a plurality of opening means passing therethrough, said cylindrical section having a plurality of tab means extending outwardly therefrom respectively adjacent said opening means.

2. A vehicle type thermostat as set forth in claim 1 wherein said abutments each has an arcuate cross-sectional configuration.

3. A vehicle type thermostat as set forth in claims 1 wherein said tab means are integral with said section.

4. A vehicle type thermostat as set forth in claim 1 wherein said abutments comprise four circumferentially spaced abutments disposed about said cylindrical section, said opening means each being disposed between adjacent abutments.

5. In a vehicle engine cooling system having an outlet housing provided with an opening receiving a vehicle type thermostat having a housing means provided with a valve seat that is controlled by a movable valve member which is interconnected to a temperature responsive device that is carried by said housing means, the improvement wherein said opening of said outlet housing has a substantially oval cross-sectional configuration defined by opposed pairs of surface means of said outlet housing that respectively define a major diameter and a minor diameter of said oval opening therebetween, said outlet housing having an exit means intersecting with said oval opening thereof substantially on said major diameter thereof, said housing means having interference fit positioning means thereon engaging said pair of opposed surface means of said outlet housing that define said minor diameter of said oval opening thereof for rotationally orienting said housing means in said opening of said outlet housing in a predetermined manner relative to said exit means whereby said thermostat can be disposed in the desired rotational position in said cooling system.

6. A vehicle engine cooling system as set forth in claim 5 wherein said interference fit positioning means of said thermostat comprises a plurality of abutments on said housing means.

7. A vehicle engine cooling system as set forth in claim 6 wherein said housing means includes a substantially cylindrical section, said abutments being integral with said section.

8. A vehicle engine cooling system as set forth in claim 7 wherein said abutments each has an arcuate cross-sectional configuration.

9. A vehicle engine cooling system as set forth in claim 7 wherein said cylindrical section has a pair of diametrically disposed opening means passing therethrough, said desired rotational position of said thermostat orienting one of said opening means with said exit means.

10. In a vehicle engine cooling system having an outlet housing provided with an opening receiving a vehicle type thermostat having a housing means provided with a valve seat that is controlled by a movable valve member which is interconnected to a temperature responsive device that is carried by said housing means, the improvement wherein said opening of said outlet housing has a substantially oval cross-sectional configuration defined by opposed pairs of surface means of said outlet housing that respectively define a major diameter and a minor diameter of said oval opening therebetween, said housing means having interference fit positioning means thereon engaging said pair of opposed surface means of said outlet housing that define said minor diameter of said oval opening thereof for rotationally orienting said housing means in said opening of said outlet housing whereby said thermostat can be disposed in the desired rotational position in said cooling system, said interference fit positioning means of said thermostat comprising a plurality of abutments on said housing means, said housing means including a substantially cylindrical section, said abutments being integral with said section, said cylindrical section having a pair of diametrically disposed opening means passing therethrough, said outlet housing having an exit means intersecting with said opening thereof, said desired rotational position of said thermostat orienting one of said opening means with said exit means, said cylindrical section having a pair of diametrically disposed tab means extending outwardly therefrom respectively adjacent said pair of opening means, said pair of tab means defining a diameter therebetween that is larger than said minor diameter of said oval opening of said housing means.

11. A vehicle engine cooling system as set forth in claim 10 wherein said tab means are integral with said section.

12. In a vehicle engine cooling system having an outlet housing provided with an opening receiving a vehicle type thermostat having a housing means provided with a valve seat that is controlled by a movable valve member which is interconnected to a temperature responsive device that is carried by said housing means, the improvement wherein said opening of said outlet housing has a substantially oval cross-sectional configuration defined by opposed pairs of surface means of said outlet housing that respectively define a major diameter and a minor diameter of said oval opening therebetween, said outlet housing having an exit means intersecting with said oval opening thereof substantially on said major diameter thereof, said housing means having interference fit positioning means thereon engaging said pair of opposed surface means of said outlet housing that define said minor diameter of said oval opening thereof for rotationally orienting said housing means in said opening of said outlet housing in a predetermined manner relative to said exit means whereby said thermostat can be disposed in the desired rotational position in said cooling system, said interference fit positioning means of said thermostat comprising a plurality of abutments on said housing means, said housing means including a substantially cylindrical section, said abutments being integral with said section, said cylindrical section having a pair of diametrically disposed opening means passing therethrough, said desired rotational position of said thermostat orienting one of said opening means with said exit means, said abutments comprising four circumferentially spaced abutments disposed about said cylindrical section, said opening means each being disposed between adjacent abutments, said abutments defining two pairs of diametrically disposed abutments with each said pair defining a diameter therebetween that is larger than said minor diameter of said oval opening.

13. A vehicle engine cooling system as set forth in claim 12 wherein each pair of diametrically disposed abutments defines a diameter therebetween that is smaller than said major diameter of said oval opening.

14. In a method of making a vehicle type thermostat having a housing means provided with a valve seat that is controlled by a movable valve member which is interconnected to a temperature responsive device that is carried by said housing means, the improvement comprising the steps of forming said housing means with interference fit positioning means thereon for rotationally orienting said housing means in a vehicle engine cooling system whereby said thermostat can be disposed in the desired rotationaly position in said cooling system, forming said interference fit positioning means to comprise a plurality of abutments on said housing means, forming said housing means to include a substantially cylindrical section, forming said abutments to be integral with said section, forming said cylindrical section with a plurality of opening means passing therethrough, and forming said cylindrical section with a plurality of tab means extending outwardly therefrom respectively adjacent said opening means.

15. A method of making a vehicle type thermostat as set forth in claim 14 and including the step of forming said abutments to each having an arcuate cross-sectional configuration.

16. A method of making a vehicle type thermostat as set forth in claim 14 and including the step of forming said tab means integral with said section.

17. A method of making a vehicle type thermostat as set forth in claim 14 and including the steps of forming said abutments to comprise four circumferentially spaced abutments disposed about said cylindrical section, and forming said opening means to each be disposed between adjacent abutments.

18. In a method of making a vehicle engine cooling system having an outlet housing provided with an opening receiving a vehicle type thermostat having a housing means provided with a valve seat that is controlled by a movable valve member which is interconnected to a temperature responsive device that is carried by said housing means, the improvement comprising the steps of forming said opening of said outlet housing to have a substantially oval cross-sectional configuration defined by opposed pairs of surface means of said outlet housing that respectively define a major diameter and a minor diameter of said oval opening therebetween, forming said housing with an exit means that intersects with said oval opening thereof substantially on said major diameter thereof, and forming said housing means to have interference fit positioning means thereon engaging said pair of opposed surface means of said outlet housing that define said minor diameter of said oval opening thereof for rotationally orienting said housing means in said opening of said outlet housing in a predetermined manner relative to said exit means whereby said thermostat can be disposed in the desired rotational position in said cooling system.

19. A method of making a vehicle engine cooling system as set forth in claim 18 and including the step of forming said interference fit positioning means of said thermostat to comprise a plurality of abutments on said housing means.

20. A method of making a vehicle engine cooling system as set forth in claim 19 and including the steps of forming said housing means to include a substantially cylindrical section, and forming said abutments to be integral with said section.

21. A method of making a vehicle engine cooling system as set forth in claim 20 and including the step of forming said abutments to each have an arcuate cross-sectional configuration.

22. A method of making a vehicle engine cooling system as set forth in claim 20 and including the step of forming said cylindrical section to have a pair of diametrically disposed opening means passing therethrough whereby said desired rotational position of said thermostat orients one of said opening means with said exit means.

23. In a method of making a vehicle engine cooling system having an outlet housing provided with an opening receiving a vehicle type thermostat having a housing means provided with a valve seat that is controlled by a movable valve member which is interconnected to a temperature responsive device that is carried by said housing means, the improvement comprising the steps of forming said opening of said outlet housing to have a substantially oval cross-sectional configuration defined by opposed pairs of surface means of said outlet housing that respectively define a major diameter and a minor diameter of said oval opening therebetween, forming said housing means to have interference fit positioning means thereon engaging said pair of opposed surface means of said outlet housing that define said minor diameter of said oval opening thereof for rotationally orienting said housing means in said opening of said outlet housing whereby said thermostat can be disposed in the desired rotational position in said cooling system, forming said interference fit positioning means of said thermostat to comprise a plurality of abutments on said housing means, forming said housing means to include a substantially cylindrical section, forming said abutments to be integral with said section, forming said cylindrical section to have a pair of diametrically disposed opening means passing therethrough, forming said outlet housing to have an exit means intersecting with said opening thereof whereby said desired rotational position of said thermostat orients one of said opening means with said exit means, forming said cylindrical section with a pair of diametrically disposed tab means extending outwardly therefrom respectively adjacent said pair of opening means, and forming said pair of tab means to define a diameter therebetween that is larger than said minor diameter of said oval opening of said housing means.

24. A method of making a vehicle engine cooling system as set forth in claim 23 and including the step of forming said tab means to be integral with said section.

25. In a method of making a vehicle engine cooling system having an outlet housing provided with an opening receiving a vehicle type thermostat having a housing means provided with a valve seat that is controlled by a movable member which is interconnected to a temperature responsive device that is carried by said housing means, the improvement comprising the steps of forming said opening of said outlet housing to have a substantially oval cross-sectional configuration defined by opposed pairs of surface means of said outlet housing that respectively define a major diameter and a minor diameter of said oval opening therebetween, forming said housing with an exit means that intersects with said oval opening thereof substantially on said major diameter thereof, forming said housing means to have interference fit positioning means thereon engaging said pair of opposed surface means of said outlet housing that define said minor diameter of said oval opening thereof for rotationally orienting said housing means in said opening of said outlet housing in a predetermined manner relative to said exit means whereby said thermostat can be disposed in the desired rotational position in said cooling system, forming said interference fit positioning means of said thermostat to comprise a plurality of abutments on said housing means, forming said housing means to include a substantially cylindrical section, forming said abutments to be integral with said section, forming said cylindrical section to have a pair of diametrically disposed opening means passing therethrough whereby said desired rotational position of said thermostat orients one of said opening means with said exit means, forming said abutments to comprise four circumferentially spaced abutments disposed about said cylindrical section, forming said opening means to each be disposed between adjacent abutments, and forming said abutments to define two pairs of diametrically disposed abutments with each said pair defining a diameter therebetween that is larger than said minor diameter of said oval opening.

26. A method of making a vehicle engine cooling system as set forth in claim 25 and including the step of forming each pair of diametrically disposed abutments to define a diameter therebetween that is smaller than said major diameter of said oval opening.

* * * * *